(No Model.) 3 Sheets—Sheet 1.
W. H. ROGERS.
HOT AIR FURNACE.
No. 497,345. Patented May 16, 1893.
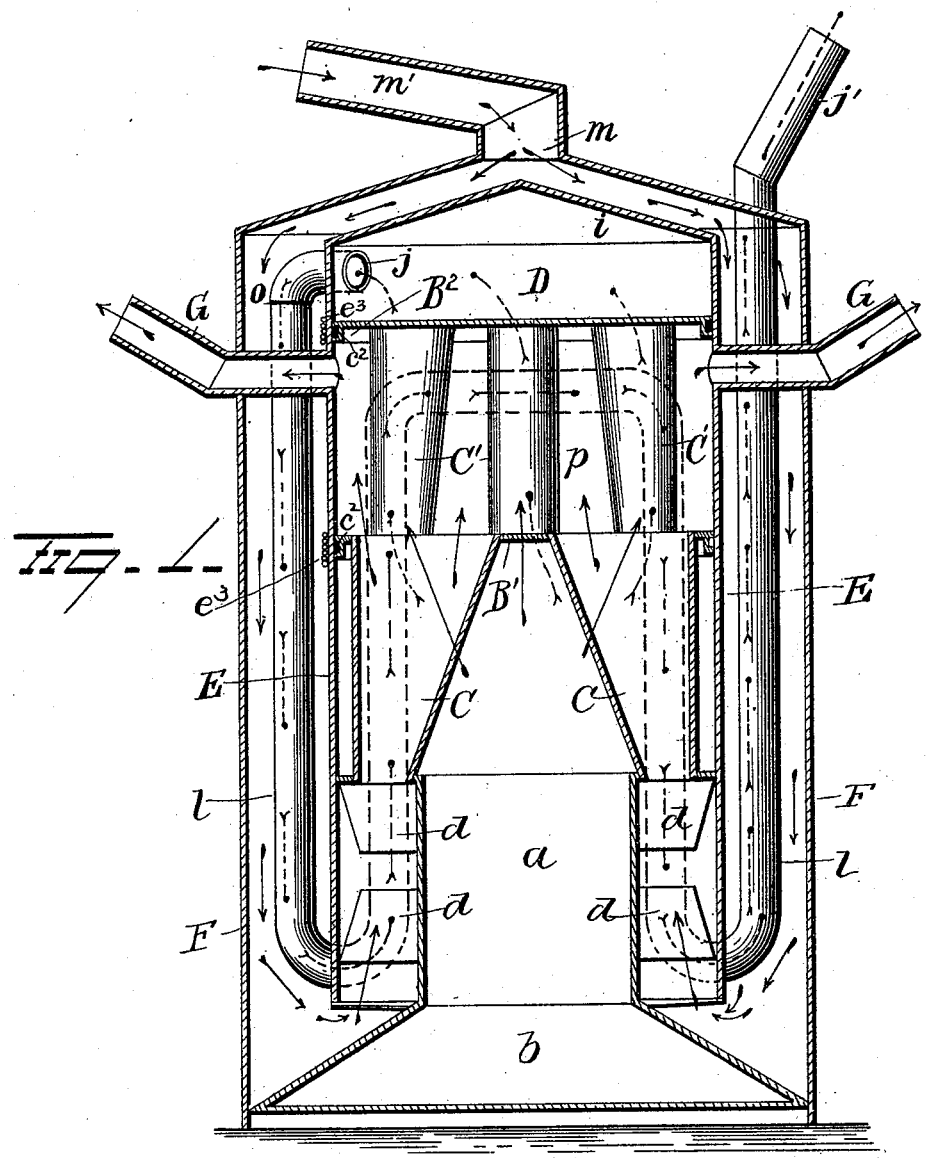
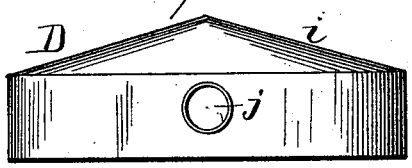
Witnesses
C. A. Nottingham
G. F. Downing
Inventor
W. H. Rogers
By H. A. Seymour
Attorney
THE NORRIS PETERS CO., PHOTO-LITHO., WASHINGTON, D. C.

(No Model.) 3 Sheets—Sheet 2.
W. H. ROGERS.
HOT AIR FURNACE.
No. 497,345. Patented May 16, 1893.
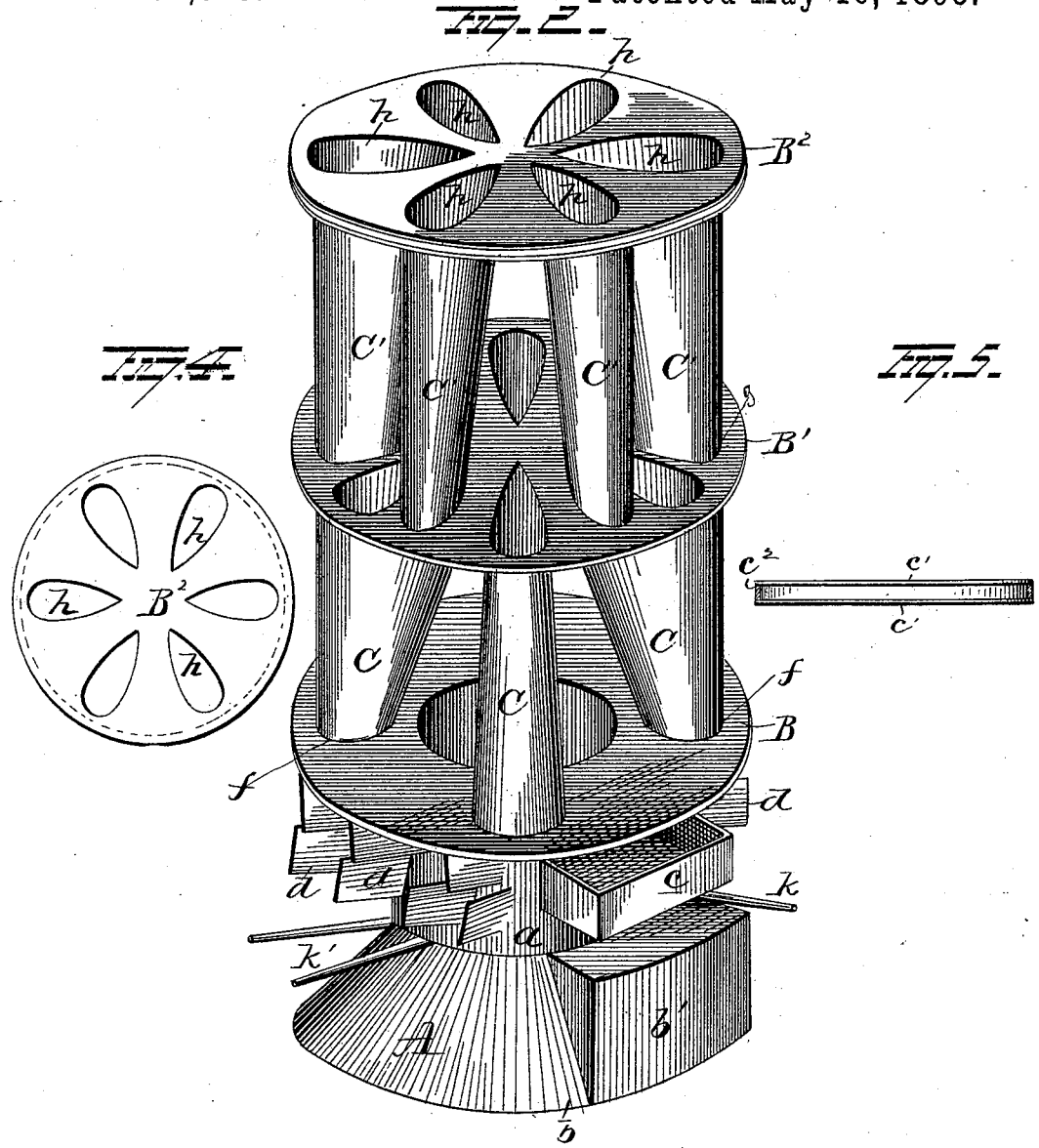
Witnesses
G. F. Downing
S. G. Nottingham
Inventor
W H Rogers.
By H A Surmon
Attorney (No Model.)  W. H. ROGERS.  3 Sheets—Sheet 3.
HOT AIR FURNACE.
No. 497,345. Patented May 16, 1893.
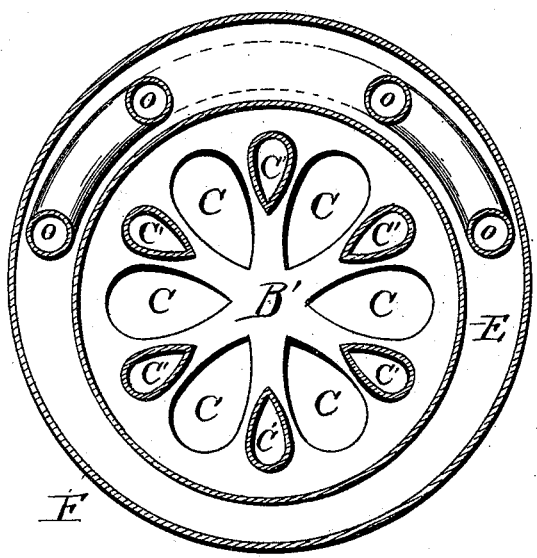

UNITED STATES PATENT OFFICE.

WILLIAM H. ROGERS, OF PHILADELPHIA, PENNSYLVANIA.

HOT-AIR FURNACE.

SPECIFICATION forming part of Letters Patent No. 497,345, dated May 16, 1893.

Application filed September 8, 1891. Serial No. 405,091. (No model.)

*To all whom it may concern:*

Be it known that I, WILLIAM H. ROGERS, residing at Philadelphia, in the county of Philadelphia and State of Pennsylvania, have invented certain new and useful Improvements in Hot-Air Furnaces; and I do hereby declare the following to be a full, clear, and exact description of the invention, such as will enable others skilled in the art to which it appertains to make and use the same.

My invention relates to an improvement in portable heating furnaces, and it consists in certain novel features of construction and combinations and arrangements of parts as hereinafter set forth and pointed out in the claims.

In the accompanying drawings: Figure 1 is a longitudinal sectional view of my improved furnace. Fig. 2 is a view of the castings comprising the interior body of the furnace. Figs. 3, 4, and 5 are detail views. Fig. 6 is a view showing plate B' and the relative arrangement of the outside casing and the parts of pipe o.

A represents the base of the furnace, comprising the fire pot $a$, and ash pit $b$, the latter being provided with a suitable door $b'$, and a water pan $c$ being located on the side or over the former.

Projecting from the exterior of the fire pot is a series of flanges $d$, intended to increase the exposed surface of the fire pot, and serve as radiators or deflectors. Located on the top of the fire pot $a$, is a ring or disk B through which the heat and products of combustion from the fire pass. A groove $e$ is made in the periphery of the ring or disk B, for the reception of asbestos filling $c^2$, and the flanges $e'$ producing this groove are bent slightly to hold the filling firmly in place, said asbestos filling serving as a packing as hereinafter explained. The ring or disk B is also provided with a series of oval openings $f$ with which a series of upwardly extending flues C communicate, said flues preferably being made oval in cross section and smaller at their lower ends than at their upper ends. A disk B' is secured to the upper ends of the flues C, and is provided with a series of openings $g$ to communicate with the said flues. The disk B' is also provided with a peripheral groove $e$ for the reception of asbestos $c^2$. The disk B' is also made with a series of openings, with which a series of flues C', similar in shape to the flues C, communicate, said flues C' being adapted to receive smoke, &c., from the combustion chamber. A third disk B² is located on top of the flues C' and provided with a series of openings $h$ for the accommodation of said flues. A smoke chamber D is located on top of the disk B² and is adapted to receive smoke, &c., entering through the flues C', said smoke chamber being preferably provided with a conical top $i$, and an elbow $j$, to which latter a smoke pipe or flue is connected as hereinafter explained. The object of making the flues C, C', larger at their tops than at their bottoms is to discharge the current of air less rapidly than received at the bottom, thus becoming partial reservoir.

A series of four (more or less) arms $k$, project from the base of the furnace and support a shell or casing E, said casing extending upwardly to the smoke chamber and held tight against the asbestos packing rings $c^2$, by spring plates $c^3$.

Surrounding the entire furnace and resting on the floor, is a shell or casing F preferably made of bright tin. Between the vertical walls of the shell or casing F and the shell E, an air flue $l$ is formed, and between the conical top of the smoke chamber and the top of the casing F is formed a continuation of said flue $l$. At the center of the top of the casing F an opening $m$ is made, and with this opening a flue $m'$, said flue $m'$ being adapted to conduct cold air from a point exterior to the compartment in which the furnace is contained, into said furnace. In the cold air flue $l$, a smoke pipe or flue $o$ is located, said smoke pipe communicating with the elbow $j$ at one point and at another point with the discharge pipe $j'$. Hot air pipes G communicate with the upper hot air chamber $p$ of the body of the furnace and lead off to various parts of the building to be heated. The air, as it passes the radiators $d$ on the outside of the fire pot, will absorb heat therefrom. The fresh air from the air chamber $l$ will be conducted, by the flues C, over the center of the fire, the most intensely heated air passing around the tubes or flues, every part of the same being equally exposed to the direct heat of the fire. The air thus heated is discharged from the flues C into the next chamber $p$ above, that being a reservoir for hot air in which to be subjected to a second heating by tubes C', passing through said heated chamber,—conducting the escaping flame from the burning gas to the smoke chamber D, from which it is carried through pipes o in the flue l between the outer tin casing and the furnace proper and back as before stated, minus the heat to chimney flue. The cold air meantime from the outside of the cellar is being discharged directly upon and around the entire furnace and within the casing F to the bottom and up through the furnace again, absorbing all the heat from the smoke pipe, which in most furnaces is lost,—thus forming a continuous circuit.

By placing the smoke chamber at the top of the furnace and locating the smoke pipe in the cold air chamber between the two shells, it will be seen that the cold air entering the outer shell at the top, will first strike the conical top of the smoke chamber and be heated, said air then passing through the cold air chamber l, being heated on its way to the bottom of the furnace. Thus, when the air reaches the bottom of the furnace and begins to enter the furnace proper it is heated to a considerable extent and when the air shall have reached the upper hot air chamber p, it will be very highly heated. By this construction, the heat of the smoke is effectually utilized to heat the air.

The furnace may, if desired, be bricked up in any suitable manner.

Having fully described my invention, what I claim as new, and desire to secure by Letters Patent, is—

1. In a hot air furnace, the combination with an inside and outside casing, of a combustion chamber, a smoke chamber inside of the inside casing, and a pipe leading sinuously from the smoke chamber through the space between the two casings and discharging outside of the outer casing, substantially as set forth.

2. The combination with an inside and an outside casing having an air chamber formed between them, and a pipe for discharging air into the top of the outside casing, of a smoke chamber in the upper portion of the inside casing, means for conducting the products of combustion into said smoke chamber, and a pipe leading from the smoke chamber with a circuitous course through the outer air chamber and discharging out of the furnace, substantially as set forth.

3. The combination with an inside and outside casing sufficiently separated to have an air chamber formed between them, a fresh air supply pipe discharging into the upper portion of this air chamber the inside casing closed at its upper end and open at the bottom to receive fresh air at that point from the outer air chamber, of a combustion chamber, an upper air chamber, a smoke chamber, pipes for conducting air through the combustion chamber but keeping it from contact with the products of combustion, said pipes discharging into the upper air chamber, pipes for conducting the heated air from this upper air chamber, a smoke chamber, pipes leading thereto from the combustion chamber, and a pipe having a circuitous passage through the outside air chamber for discharging the products of combustion, substantially as set forth.

4. In a furnace, the combination with a body portion, of disks for separating the chambers thereof, each of said disks having a grooved periphery and asbestos located in said groove and a shell inclosing said body and bearing against the asbestos in the disks, substantially as set forth.

In testimony whereof I have signed this specification in the presence of two subscribing witnesses.

WILLIAM H. ROGERS.

Witnesses:
CHAS. MATHEWS,
WM. COOK ROGERS.